UNITED STATES PATENT OFFICE.

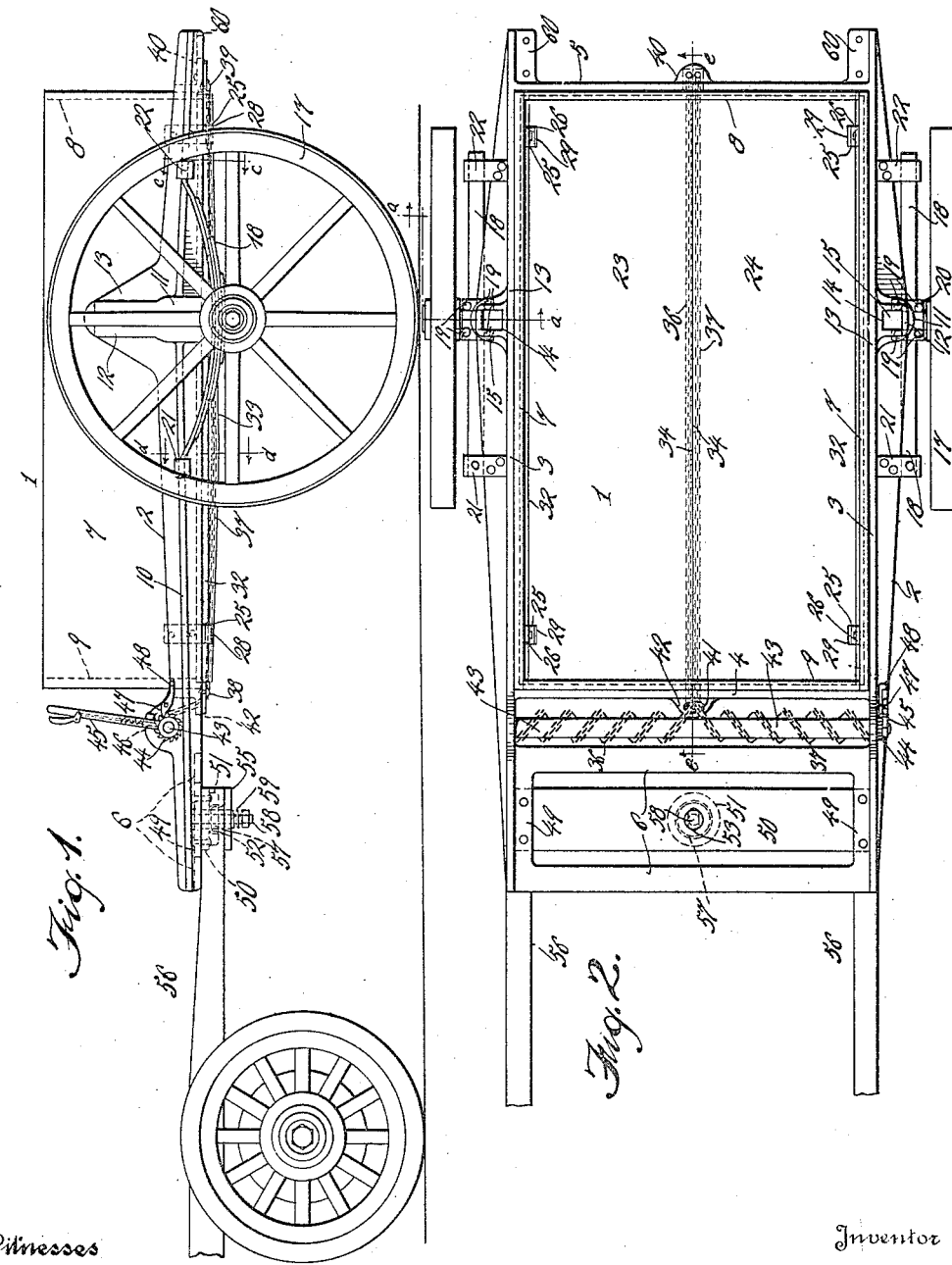

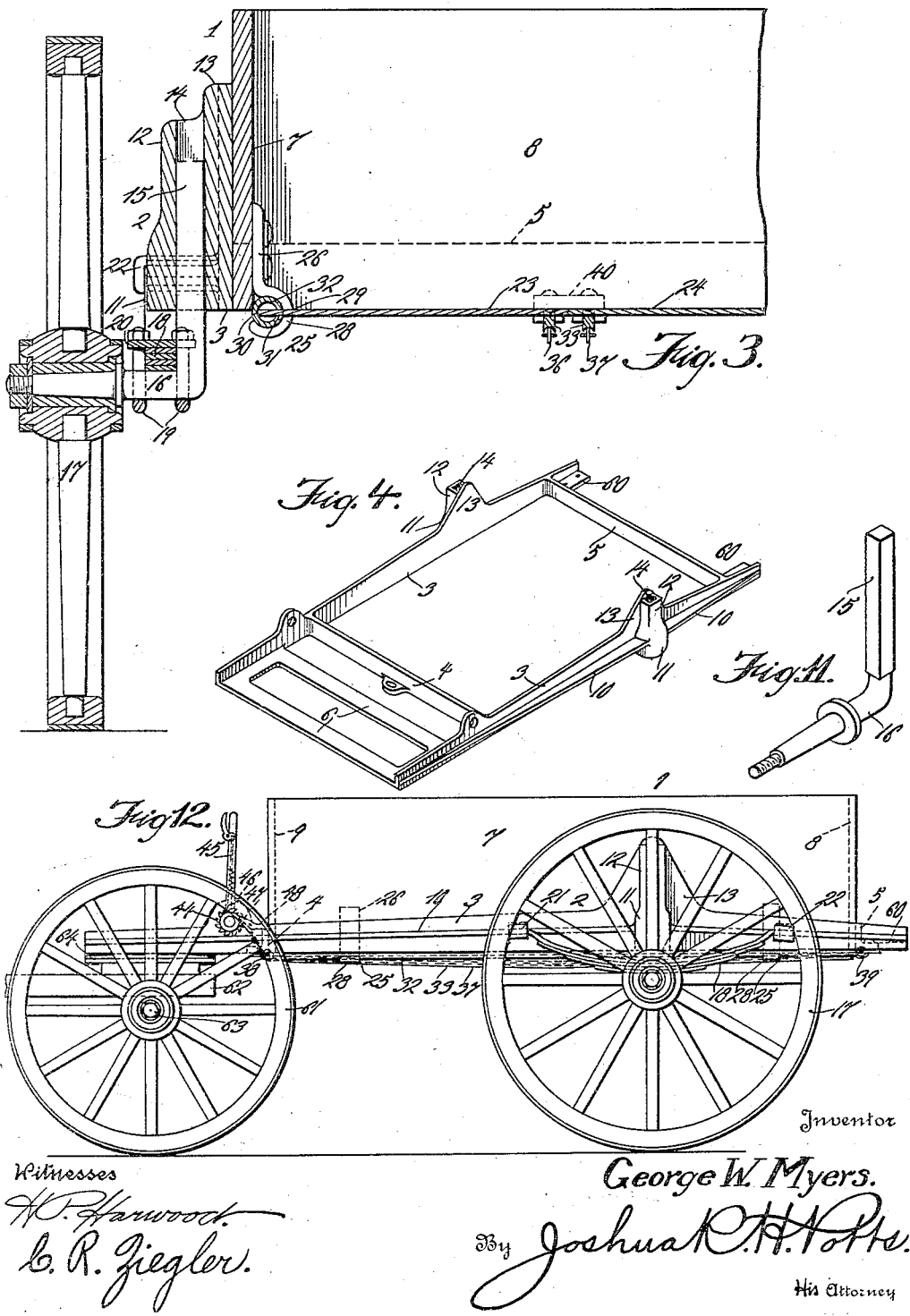

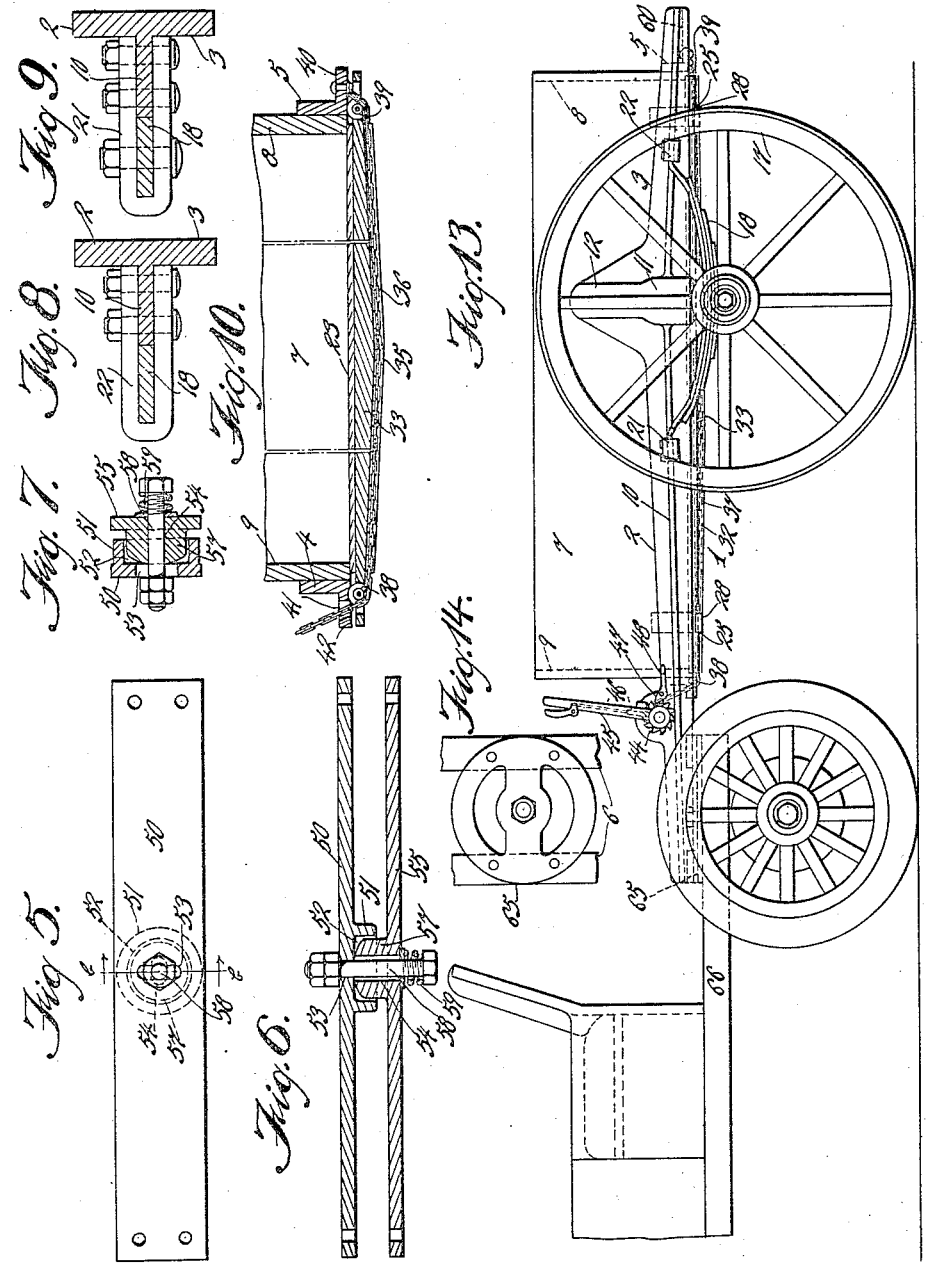

GEORGE W. MYERS, OF PHILADELPHIA, PENNSYLVANIA.

VEHICLE.

1,243,662.  Specification of Letters Patent.  Patented Oct. 16, 1917.

Application filed October 12, 1916. Serial No. 125,278.

*To all whom it may concern:*

Be it known that I, GEORGE W. MYERS, a citizen of the United States, residing at Philadelphia, in the county of Philadelphia and State of Pennsylvania, have invented certain new and useful Improvements in Vehicles, of which the following is a specification.

My invention consists of an improved vehicle and is particularly serviceable as a drop-bottom dump cart or wagon.

One object of my invention is to provide a vehicle of the above described type with a frame or chassis which is made in one piece and provides a support for axles and body portion without the inclusion of any members that would prevent free falling space for the material carried thereby.

Another object is to so construct my improved vehicle that it will be strong and durable and can be used as a tractor or trailer or as an ordinary cart or wagon.

A still further object of my invention is to provide a vehicle of the above described class which may be quickly and easily manufactured and assembled and can be produced at a reasonably low cost.

These objects, and other advantageous ends which will be described hereinafter, I attain in the following manner, reference being had to the accompanying drawings in which—

Figure 1 is a side elevation of my improved vehicle made in the form of a drop-bottom dump cart and used as a trailer or tractor in connection with another vehicle which supplies the motive power.

Fig. 2 is a plan view of Fig. 1 with a portion of said motive power supplying vehicle cut away.

Fig. 3 is an enlarged sectional elevation taken on the line *a—a* of Fig. 2.

Fig. 4 is a perspective view of my improved frame or chassis.

Figs. 5 and 6 are respectively plan and longitudinal sectional elevation views of pivotal connecting means which I preferably employ when using my improved vehicle as a trailer.

Fig. 7 is a section on the line *b—b* of Fig. 5.

Fig. 8 is an enlarged fragmentary section through a spring-supporting clip adjacent the rear of the vehicle and taken on the line *c—c* of Fig. 1.

Fig. 9 is an enlarged fragmentary section through one of the forward spring-supporting clips and taken on the line *d—d* of Fig. 1.

Fig. 10 is a fragmentary longitudinal section taken on the line *e—e* of Fig. 2 through one of the drop-bottom plates of the vehicle.

Fig. 11 is a perspective view of one of the axles which I employ.

Fig. 12 is a side elevation of my improved vehicle when used as a wagon having forward and rear wheels.

Fig. 13 is a side elevation of my invention illustrating a fifth wheel connection which is applicable to be connected to the top of the rear end of a vehicle such for example as an automobile.

Fig. 14 is a fragmentary plan elevation of the fifth wheel structure shown in Fig. 13.

Referring to the drawings, 1 is the body portion which includes a frame 2 which is made of a single piece of cast steel. This frame 2 has side rails 3 which are substantially parallel and are connected by forward and transverse integral webs 4 and 5 and forward bars 6 which are spaced apart as clearly shown in Fig. 2.

The inner surfaces of the rails 3 and bars 4 and 5 are made plain and free of obstructions which would interfere with the dumping of the material, said rails and sides forming the foundation to which are secured side boards 7 and tail and front boards 8 and 9 respectively.

The rails 3 have ribs 10 which extend to opposite ends thereof and within the length of said rails intersect large bosses 11, said bosses being substantially vertical and curved in cross section. These bosses blend at their upper portion into angular extensions 12, said extensions being backed by upwardly extending triangular projections 13, said bosses, extensions, and triangular projections being cast integral with the rails 3.

The extensions 12 and bosses 11 have angular holes 14 which form slide-ways for upwardly extending portions 15 on axles 16, said upwardly extending portions 15 being angular in cross section (see Figs. 2 and 11), said axles forming the support for the wheels 17.

Half elliptical springs 18 have their lower surface in engagement with the upper portion of the axles 16 (see Figs. 1, 2, and 3) and are held thereto by U-shaped bolts 19 which engage plates 20 which abut the upper surfaces of said springs and embrace the upright portions 15 of the axles. One end of each of said springs is secured to clips 21 which are bolted to the side flanges 10 of the rails 3, while the other ends of said springs are designed to slide between clips 22 which are also secured to said flanges 10.

Plates 23 and 24 form the bottom of the vehicle and are hinged at 25 to opposite inner surfaces of the rails 3. This hinge connection between the plates 23 and 24 and the side rails 3 includes members 26 which are secured to the side boards 7 and have hooked lower ends 28 (see Fig. 3) which slide through openings 29 in said latter plates.

The edge portions 30 of said plates extend through slots 31 in pipes 32, and the pipes 32 are partially enveloped by the hooked ends 28 of the members 26. The hooked ends 28 are of sufficient length to prevent the pipes from becoming disengaged therefrom, and the fact that said hooked ends 28 pass through the slots 29, prevents longitudinal movement of said plates 23 and 24. A strong hinge connection is thus provided which is extremely serviceable and durable.

Each of the plates 23 and 24 has a bar 33 on its under surface adjacent the meeting edges 34. Each of these bars 33 has a longitudinally extending concavity or groove and is provided adjacent its middle with a depending swell 35.

Chains 36 and 37 are employed to raise the bottom plates 23 and 24 into the positions illustrated and these chains are designed to pass under idler rollers 38 and 39 (see Fig. 10) and within the concavity of said bars 33. The rear end of each of the chains 36 and 37 after passing around the idler 39, extends upwardly and is connected to a projecting ear 40 on the rear transverse web 5.

The forward end portions of the chains 36 and 37 after passing around the idlers 38, pass upwardly through an eyelet 41 in an ear 42 formed on the forward transverse web 4. The free forward ends of said chains 36 and 37 are connected to a winding roll 43 which has its opposite ends journaled in the side rails 3.

The roll 43 is provided with a ratchet 44 and a lever 45 has a pawl 46 which engages said ratchet when manually operated to rotate the roll 43 and thereby draw said chains 36 and 37 taut and consequently raise the bottom plates 23 and 24.

A detent pawl 47 is pivotally connected to one of the side rails 3 and is designed to engage the ratchet 44 and hold the bottom plates 23 and 24 in their raised position; however, when the detent pawl 47 is released, the weight of the plates 23 and 24 and the contents of the vehicle causes said plates to open downwardly by gravity and thereby discharge the contents of the vehicle. To again raise said bottom plates, lever 45 is oscillated to intermittently turn the ratchet 44, said detent 47 acting to prevent back movement of said ratchet during the inoperative portion of the movement of said lever 45, the ratchet engaging portion of the detent 47 being heavier and acting to overbalance the opposite end 48 of said detent.

The forward end of the frame 2 is provided with inwardly extending side flanges 49, and these side flanges form a support for an upper transom beam 50 (see Figs. 1, 2, 5, 6, and 7). The beam 50 has, centrally within its length, a depending sleeve 51 which provides a recess 52. An elongated hole or slot 53 is formed in said beam 50 and communicates with the recess 52. The length of the slot 53 extends in the direction of the length of said vehicle and is designed to register with a substantially similar slot 54 which is formed centrally within the length of a lower transom beam 55, the latter being designed to be secured to the frame or chassis 56 of another vehicle. The slot 54 also extends through a circular lug 57 which extends upwardly and fits within said recess 52, said lug 57 being of slightly smaller diameter than the recess 52 and has its uppermost surface convex in order to form a knuckle joint with said beam 50.

A king bolt 58 extends through the slots 53 and 54, said king bolt having a resilient backing in the form of a strong expansion spring 59 which normally holds the lug 57 in contact with the beam 50, but permits a slight separating movement therebetween to compensate for the differences in the level of the road over which the vehicles may travel.

It will be further noted that by the provision of the slots 53 and 54, it is possible for the beams 50 and 55 to assume angular positions with respect to each other in the direction of their widths. The rear of the frame 2 is provided with rear supporting flanges 60 to which, if desired, may be attached a beam similar to the beam 50, so that one or more of my improved vehicles may be linked in tandem.

In Fig. 12 I have shown my improved vehicle in the form of a wagon having in addition to the wheel 17 above described, front wheels 61 which are supported by a structure 62 having a front axle 63 thereon, said structure 62 including a fifth wheel 64 which is pivotally connected to the supporting bars 6. I thus dispense with the device illustrated in Figs. 5, 6, and 7, and substitute in lieu thereof the fifth wheel 64. In all other respects the construction is similar to that above described and I have therefore given the same like reference numerals.

In Fig. 13, I have shown my improved vehicle as a trailer including a fifth wheel 65 which is pivotally connected to the rear of an automobile 66.

A vehicle constructed in accordance with my invention provides a strong frame without any transverse members or axles which extend in the space through which the material is dumped, since the frame provides ample support in its side rails and bosses for the axles, the springs providing sufficient resiliency.

The provision of the bars 33 and their chain connection insures that the bottom plates 23 and 24 come to a positive closing position, thus rendering the vehicle particularly serviceable for use in construction work in cities where it is desirable to prevent the accidental falling of dirt upon the streets.

Furthermore, the construction of the bosses 11 and the triangular projections 13, together with the side rails 10 and cross members above described, provides a frame which is fully capable of supporting an extremely heavy load.

While I have described the members 7, 8, and 9, as side boards, it will be understood that they may be made of sheet metal, wood, or other suitable material.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A vehicle including a frame having upright holes therein providing slideways, axles having substantially horizontal wheel-supporting portions and upwardly extending portions slidably fitting said slideways, securing plates, springs supported on said horizontal portions of the axles and mounted below said plates, a plurality of U-shape securing members arranged at opposite edges of each of said springs and having their free ends extending through and secured to said plates and their looped portions passing around the bottoms of said axles, and means for holding the springs in supporting engagement with the frame, substantially as described.

2. A vehicle including a frame having upright holes therein providing slideways, axles having substantially horizontal wheel-supporting portions and upwardly extending portions slidably fitting said slideways, springs supported on said horizontal portions of the axles, plates on said springs, clamping means for securing the plates to the axles, means for holding the springs in supporting engagement with the frame, said plates having portions embracing the upright portions of the axles, substantially as described.

3. A vehicle including a metallic frame having oppositely disposed bosses, said bosses having upright holes therein providing angular slideways, axles having substantially horizontal wheel-supporting portions and upwardly extending angular portions designed to slide within said slideways, said frame including side ribs extending longitudinally thereof, springs resting on the axles between the horizontal portions and the side ribs, and means for holding the springs in engagement with the frame, substantially as described.

4. A vehicle including a metallic frame having oppositely disposed bosses, said bosses having upright holes therein providing angular slide-ways, axles having substantially horizontal wheel-supporting portions and upwardly extending angular portions designed to slide within said slide-ways, said frame including side ribs intersecting said bosses, springs resting on the axles between the horizontal portions and the side ribs, and means for holding the springs in engagement with the frame, substantially as described.

5. A vehicle including a metallic frame cast in one piece and including oppositely disposed bosses, said bosses having holes therein providing angular slide-ways, axles having upwardly extending angular portions designed to slide within said slide-ways, said frame including side ribs intersecting said bosses, springs secured to said axles, clips secured to said side ribs of the frame and securing the ends of said springs, substantially as described.

In testimony whereof I have signed my name to this specification in the presence of two subscribing witnesses.

GEORGE W. MYERS.

Witnesses:
RHODA E. GILLIES,
CHAS. E. POTTS.

Copies of this patent may be obtained for five cents each, by addressing the "Commissioner of Patents, Washington, D. C."